ABSTRACT OF THE DISCLOSURE

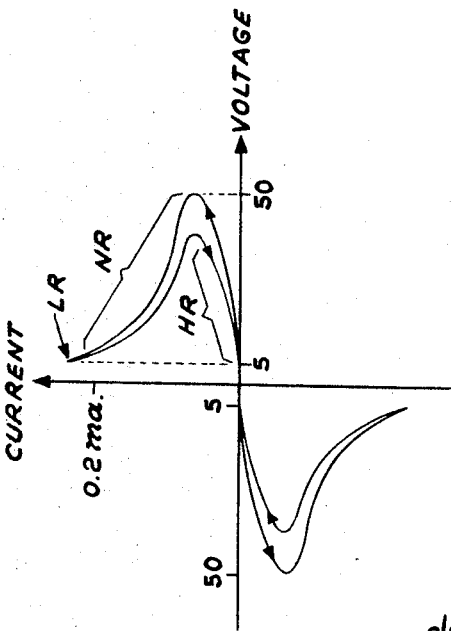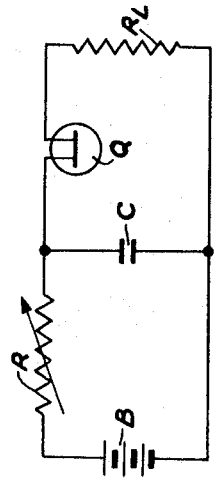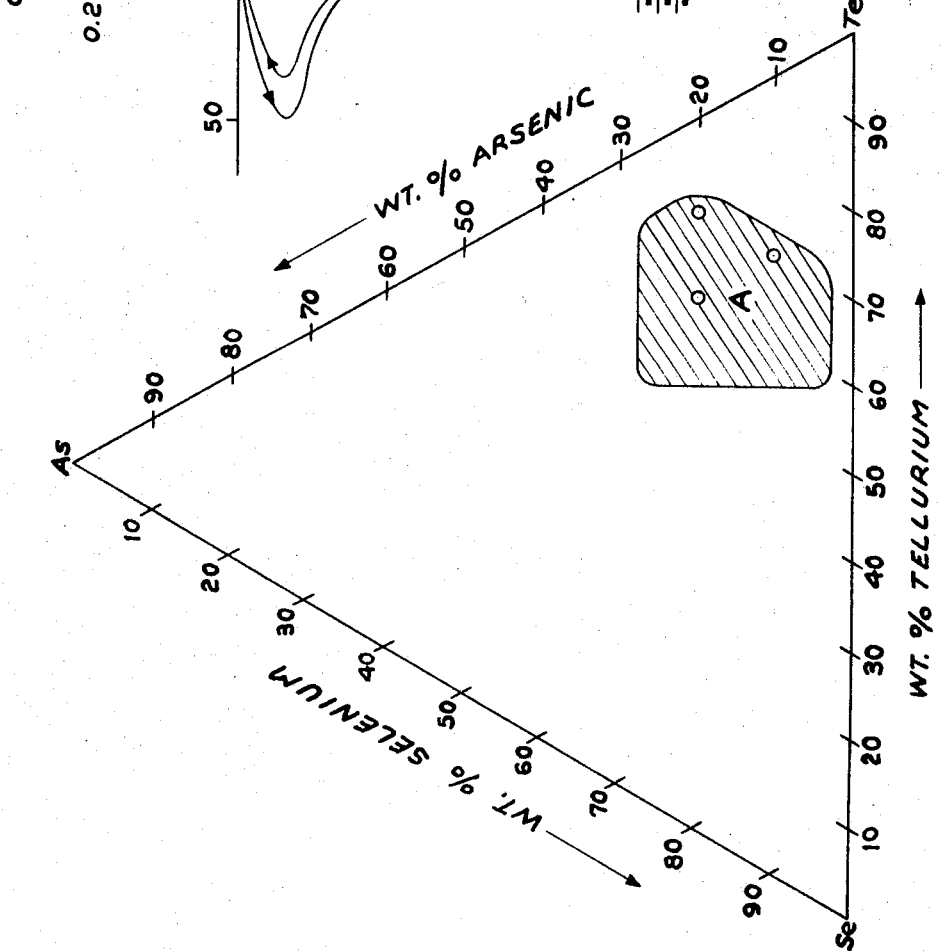
INVENTORS.
DANIEL J. SHANEFIELD
JAMES H. BATTLE
PAUL E. LIGHTY
ATTORNEY 3,448,425
SOLID STATE ELEMENT COMPRISING SEMICONDUCTIVE GLASS COMPOSITION EXHIBITING NEGATIVE INCREMENTAL RESISTANCE
Daniel J. Shanefield, New York, N.Y., and James H. Battle, Boonton, and Paul E. Lighty, Lafayette, N.J., assignors to International Telephone and Telegraph Corporation, a corporation of Delaware
Filed Dec. 21, 1966, Ser. No. 605,528
Int. Cl. H01c 7/10
U.S. Cl. 338—20                                              5 Claims

A semiconductive glass composition of the ternary group arsenic-tellurium-selenium. The glass has a voltage-current characteristic initially exhibiting relatively high resistance. As the applied voltage is increased, a form of "break over" occurs in which the voltage-current characteristic exhibits negative incremental resistance. If after "break over" has occurred the applied voltage is maintained at a predetermined sustaining value, the glass exhibits relatively low electrical resistance. The glass is stable only in its high resistance state, and reverts to this state when the applied voltage is removed.

Related applications and patents

The semiconducting glasses described herein are generally related to the materials and devices described in U.S. Patent Nos. 3,117,013, 3,241,009 and 3,271,591, as well as U.S. patent application Nos. 537,187 (filed Mar. 24, 1966) and 557,944 (filed June 16, 1966), both said applications being assigned to the assignee of the instant application.

Background of the invention

This invention relates to the field of semiconducting glasses and more particularly to glasses having voltage-current characteristics exhibiting negative incremental resistance.

Semiconducting glasses which exhibit two or more physical states having different electrical characteristics are well know in the art. These states are characteristic of the bulk of the material, the devices embodying such materials being non-rectifying and capable of being electrically switched between the various states thereof.

The physical phenomena presently believed to be responsible for the electrically inducible physical state changes exhibited by these materials are described in detail in copending applications, Nos. 537,187 and 557,-944. Briefly, however, it is believed that one state of the material is characterized by a relatively high resistance non-crystalline (perhaps locally ordered but macroscopically amorphous or polycrystalline) bulk structure, while the other state is characterized by a relatively low resistance crystalline structure.

Devices fabricated utilizing these semiconductive glasses as the active elements thereof are generally characterized as being either monostable or bistable. By the term "bistable" is meant a device which exhibits two stable physical states characterized by substantially different values of bulk resistivity (and therefore of resistance between the device electrodes), which is electrically switchable between the two resistance states, and which remains in a selected one of said states when the electrical control signals are terminated at the device electrodes.

By the term "monostable" is meant a device which exhibits a first physical state characterized by a relatively high bulk resistivity and a second physical state characterized by a relatively low bulk resistivity, the electrical transition between said states being characterized by a region of negative incremental resistance exhibited by the voltage-current characteristic of the device; the monostable device is by definition stable in only one of said first and second resistance states, and reverts to its stable state when the applied electrical signals are terminated at the device electrodes.

Materials for bistable devices having compositions from the ternary group arsenic-tellurium-iodine are disclosed in U.S. Pats. Nos. 3,117,013 and 3,241,009. These devices generally exhibit rapid transitions between their relatively high and relatively low resistance states when the electrical control signal applied to the device electrodes exceeds a predetermined voltage or current threshold value. These devices do not exhibit a useful region of negative incremental resistance which is suitable for the construction of practical oscillators, amplifiers and other devices employing negative resistance effects. The greatest utility of such bistable devices resides in their use as switching and memory elements.

Negative incremental resistance effects in semiconducing glasses have been reported by B. T. Kolomiyets and E. A. Lebedev for certain compositions of the quaternary group thallium-arsenic-selenium-tellurium in a paper entitled "V–I Characteristic of a Point Contact With Vitreous Semiconductors." This paper appears in Radio Engineering and Electronic Physics, volume 8, 1941.

Some work has been done in investigating electrical properties of certain specific semiconductive glasses of the ternary group arsenic-tellurium-selenium, as reported in the following papers:

(1) B. T. Kolomiyets and T. F. Nazarova, "The Role of Impurity in the Conductivity of Vitreous $As_2SeTe_2$," Fizika Tverdogo Tela, volume 2, No. 1, pages 174–176, January 1960.

(2) T. N. Vengel and B. T. Kolomiyets, "Vitreous Semiconductors," Soviet Physics-Tech. Physics, volume 2, page 2314, 1957.

The semiconducting glasses disclosed in the aforementioned references, however, all are either bistable or have tendencies to become semipermanently and stably of low resistance after a prolonged period of device operation. The tendency of these prior art semiconductive glasses, which are initially in a high resistance state, to "lock" in the low resistance state is especially apparent when interrupted DC (such as half wave rectified 60 Hz. AC) is passed through the glass for a period of time on the order of 48 hours or more. When this locking condition occurs, the negative resistance region of the voltage-current characteristic of the glass virtually disappears.

Accordingly, an object of this invention is to provide monostable semiconductive glasses exhibiting improved stability against the tendency to lock in the low resistance condition when interrupted direct current is applied thereto. Other objects of the invention will become apparent by reference to the following detailed description and appended claims.

Summary

The invention herein is based upon the provision of novel semiconducting glass compositions, and devices fabricated therewith, of the ternary group arsenic-tellurium-selenium, such glasses exhibiting improved stability against the tendency of prior art semiconductive glasses to lock in the low resistance condition during operation thereof.

In the drawing

FIG. 1 shows a ternary diagram indicating the range of compositions according to the invention;

FIG. 2 shows the voltage-current characteristic of a monostable device incorporating a semiconductive glass according to a preferred embodiment of the invention; and FIG. 3 shows the circuit of a relaxation oscillator employing a monostable solid state device according to the invention.

*Detailed description*

FIG. 1 shows a ternary diagram for the novel range of compositions which applicants have discovered provide unexpectedly advantageous results over prior art materials when employed as monostable non-rectifying semiconductor elements, the compositions of this invention, by weight, being indicated by the shaded area A. Samples of compositions made for the purpose of obtaining this diagram were obtained by the following technique.

The starting materials for the preparation of these glasses consisted of high purity arsenic, tellurium and selenium. Samples were prepared in clear fused quartz vials having the approximate dimensions of 5/16" inside diameter by 6" long. The weights of the elements required to form a product of a given composition were calculated so that after reaction the product would just fill a bulb at the bottom of the vial. The required quantities of arsenic, tellurium, and selenium were weighted out in a dry nitrogen atmosphere and transferred to the quartz vial. The vial is then evacuated and sealed with a hydrogen torch. The sealed quartz vial was then placed inside a steel bomb with loosely fitting but securely fixed end caps. The bomb was then heated at 900° C. for 12 hours in a horizontal furnace having a combustion tube which rotated about its own axis during the firing. After the reaction, the bomb and its contents were allowed to cool in a vertical position so that the majority of the products would solidify in the bulb at the bottom of the vital. After cooling, the vial was removed from the steel bomb and small quantities of materials which had condensed in the upper portion of the tube were forced down into the bulk by heating the tube with a hydrogen torch. The tube was heated with a small hydrogen flame at a point just above the bulb until it collapsed and sealed. The tube above the collapsed portion was then drawn off and the section of the vial containing the product was then reheated in the steel bomb a further 2 hours at 900° C. in the rotating tube furnace. After firing, the bomb and its contents were allowed to air-cool to room temperature.

A sample of the material was then utilized in fabrication of a bistable memory device by applying electrodes thereto in the manner described in U.S. Patent No. 3,241,009 commencing at column 5, line 30 thereof. The voltage-current characteristic of the resultant device was then plotted on an oscilloscope by applying a 60 Hz. A.C. sine wave to the device electrodes through a series resistance. The resultant voltage-current characteristic is shown in FIG. 2.

The following compositions were found to exhibit especially desirable negative incremental resistance voltage-current characteristics, and are to be preferred: 60% tellurium, 20% arsenic, 20% selenium; 70% tellurium, 20% arsenic, 10% selenium; and 70% tellurium, 10% arsenic, 20% selenium.

The numerical values of voltage and current shown in FIG. 2 relate to a device constructed by applying "nearly point" contacts to the composition 60% tellurium, 20% arsenic, 20% selenium, The spacing between the electrodes on the order of 0.015 inch. Each electrode was roughly circular with a diameter on the order of 0.020 inch. It was found that good characteristics were obtained with contacts having areas not exceeding a value corresponding to the area of a circular contact having a diameter on the order of 0.020 inch. it was also found that iron, nickel and tungsten made especially good contact materials and did not appear to degrade the characteristics of the bulk semiconductive material. Copper was found to be an especially poor contact material, having a tendency to cause "lock on" of the device in a low resistance state.

It should be understood that while U.S. Pats. Nos. 3,117,013, 3,241,009 and 3,271,591 show specific configurations for making electrical contact to the semiconductive glass, it is possible to provide electrical contact to the glassy body in other ways.

The voltage-current characteristic shown in FIG. 2 and typical of the monostable semiconductive glasses according to the invention was found to be quite stable in comparison to that of semiconductive glasses heretofore known. It is evident that the device is non-rectifying, i.e. that the characteristics are substantially independent of the polarity of the applied voltage. It is also evident that the characteristic may be considered as having three distinct regions, viz. (i) a relatively high resistance region HR characterized by a relatively small current flow for applied voltages not exceeding a predetermined "break over" voltage (approximately 50 volts for the device whose characteristic is shown in FIG. 2), (ii) a negative resistance region NR characterized by negative incremental resistance, i.e. a region wherein the current through the device increases even though the voltage across the device terminals is decreasing and (iii) a region of relatively low resistance LR characterized by a relatively high current through the device at a relatively low applied voltage. The characteristic is seen to display some hysteresis, but returns to its high resistance region HR when the current through the device is externally decreased or the applied voltage is reduced below the "sustaining" level (shown as 5 volts for the particular device whose characteristic is shown in FIG. 2). The device is unstable in the low resistance region LR, i.e., the device can be maintained in this low resistance region only while an external electrical signal having specific characteristics is applied to the device electrodes. When this electrical signal is removed, the device reverts to its high resistance condition.

It is evident from FIG. 2 that the voltage-current characteristic of the device is current-controlled, i.e., is substantially single valued along the current axis. Therefore the device may be employed in circuitry whenever other types of current-controlled negative resistance elements are presently utilized. The device possesses the additional advantage of being insensitive to the polarity of the applied voltage, so that unique applications are possible for which other types of current controlled negative resistance elements heretofore known are not suitable.

FIG. 3 shows the circuit for a simple relaxation oscillator employing a monostable negative resistance semiconductive glass device according to the invention. The device was fabricated by contacting a cylindrical mass of monostable material having the composition 60% tellurium, 20% arsenic, 20% selenium with a pair of spaced iron electrodes each having a circular contact area and a diameter on the order of 0.020 inch, one electrode being attached at each end of the glassy cylinder. Each electrode was electrically connected to the glassy body by means of a simple S-shaped resilient pressure contact. The resistor R has a maximum value of 10,000 ohms, the capacitor C has a value of 1 microfarad, and the battery B has a voltage rating of 90 volts. The load resistance $R_1$ has a range of 500 to 5000 ohms. The circuit operates as a sawtooth oscillator delivering substantial power to the load resistance $R_1$.

While the principles of the invention have been described above in connection with specific embodiments, and particular modifications thereof, it is to be clearly understood that this description is made only by way of example and not as a limitation on the scope of the invention.

We claim:

1. A non-rectifying solid state element having an electrical voltage-current characteristic including a region of relatively high resistance, a region of negative incremental resistance and a region of relatively low resistance, said electrical voltage characteristic being stable only in said high resistance region, comprising:
  a body of semiconductive glass from the ternary group arsenic-tellurium-selenium having a composition, by weight, within the shaded area A of FIG. 1 of the drawing; and
  at least two spaced electrodes in contact with said body.

2. A solid state element according to claim 1, wherein each of said electrodes comprises a metal selected from the group consisting of iron, nickel and tungsten.

3. A solid state element according to claim 1 having a composition comprising, by weight, 60% tellurium, 20% arsenic and 20% selenium.

4. A solid state element according to claim 1 having a composition comprising, by weight, 70% tellurium, 20% arsenic and 10% selenium.

5. A solid state element according to claim 1 having a composition comprising, by weight, 70% tellurium, 10% arsenic and 20% selenium.

References Cited

UNITED STATES PATENTS 3,241,009  3/1966  Dewald et al. _____ 317—234

OTHER REFERENCES

N. A. Goriunova et al., Academy of Sciences, U.S.S.R. Bulletin Physical Series, vol. 20 (12), 1956, pp. 1372, 1373, 1374.

A. R. Hilton et al., Physics and Chemistry of Glasses, vol. 7, No. 4, August 1966, pp. 111, 112.

REUBEN EPSTEIN, *Primary Examiner.*

U.S. Cl. X.R.

106—47; 252—512; 307—324; 317—234; 331—107; 338—76